United States Patent
Arov et al.

(10) Patent No.: US 11,093,606 B2
(45) Date of Patent: Aug. 17, 2021

(54) SYSTEM AND METHOD FOR DETECTING A CYBER-ATTACK AT SCADA/ICS MANAGED PLANTS

(71) Applicant: RAFAEL ADVANCED DEFENSE SYSTEMS LTD., Haifa (IL)

(72) Inventors: Michael Arov, Even Yehuda (IL); Ronen Ochman, Kibbutz Saar (IL); Moshe Cohen, Karmiel (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 163 days.

(21) Appl. No.: 15/989,748

(22) Filed: May 25, 2018

(65) Prior Publication Data
US 2018/0276375 A1 Sep. 27, 2018

Related U.S. Application Data (63) Continuation-in-part of application No. PCT/IL2016/051268, filed on Nov. 25, 2016.

(30) Foreign Application Priority Data

Nov. 26, 2015 (IL) .......................................... 242808

(51) Int. Cl.
*G06F 21/55* (2013.01)
*H04L 29/06* (2006.01)
(Continued)

(52) U.S. Cl.
CPC ....... *G06F 21/552* (2013.01); *G05B 19/0428* (2013.01); *G05B 19/4185* (2013.01);
(Continued)

(58) Field of Classification Search
CPC ... G06F 21/55; G06F 21/552; H04L 63/1408; H04L 63/1416
See application file for complete search history.

(56) References Cited

U.S. PATENT DOCUMENTS 8,667,589 B1 * 3/2014 Saprygin ............. H04L 63/0209
726/23
9,697,355 B1 * 7/2017 Park ...................... G06F 21/552
(Continued)

FOREIGN PATENT DOCUMENTS

EP 2866407 4/2015

OTHER PUBLICATIONS

International Search Report and Written Opinion for International Application No. PCT/IL2016/051268 dated Nov. 25, 2016.

*Primary Examiner* — Jason Chiang
(74) *Attorney, Agent, or Firm* — Alston & Bird LLP (57) ABSTRACT

System for detecting a cyber-attack of a SCADA system managed plant. Each industrial computerized device of the system comprises a processor configured with a data validation module to determine whether data flow outputted from a SCADA-connected controller is authentic, and with an alert issuing mechanism activated following detection that the outputted data flow is indicative of a cyber-attack. The at least one dedicated industrial computerized device is operable to passively monitor in parallel data communicated between each of the controllers and the SCADA system including the outputted data at the nearest points of each of the controllers; seek mismatches between the plant state and the physical operation model; if a mismatch is detected, determine whether the mismatch is indicative of a cyber-attack perpetrated with respect to one of the controllers or an operational malfunction; and upon detecting a cyber-attack, activate the alert issuing mechanism to issue a security alert.

19 Claims, 4 Drawing Sheets

(51) Int. Cl.
  *H04L 12/12* (2006.01)
  *G06F 21/85* (2013.01)
  *G06F 21/57* (2013.01)
  *H04L 29/08* (2006.01)
  *G05B 19/042* (2006.01)
  *G05B 19/418* (2006.01)

(52) U.S. Cl.
  CPC ............ *G06F 21/55* (2013.01); *G06F 21/577* (2013.01); *G06F 21/85* (2013.01); *H04L 12/12* (2013.01); *H04L 63/1408* (2013.01); *H04L 63/1416* (2013.01); *H04L 67/12* (2013.01)

(56) References Cited

U.S. PATENT DOCUMENTS

| | | | |
|---|---|---|---|
| 2005/0015624 A1* | 1/2005 | Ginter | H04L 63/20 726/4 |
| 2006/0034305 A1* | 2/2006 | Heimerdinger | H04L 63/1408 370/408 |
| 2011/0252479 A1* | 10/2011 | Beresnevichiene | G06F 21/577 726/25 |
| 2012/0304007 A1* | 11/2012 | Hanks | G05B 23/0216 714/26 |
| 2013/0132149 A1* | 5/2013 | Wei | G05B 23/0281 705/7.28 |
| 2013/0176132 A1 | 7/2013 | Bush | |
| 2014/0244192 A1* | 8/2014 | Craig | G01R 21/06 702/62 |
| 2014/0245449 A1 | 8/2014 | Powell et al. | |
| 2015/0293516 A1 | 10/2015 | Akiyama et al. | |
| 2015/0301515 A1* | 10/2015 | Houmb | G06Q 50/26 700/108 |
| 2015/0346706 A1* | 12/2015 | Gendelman | G05B 19/058 700/79 |
| 2016/0301710 A1* | 10/2016 | Hason | G06F 21/577 |
| 2016/0330225 A1* | 11/2016 | Kroyzer | G06N 20/00 |

* cited by examiner

SYSTEM AND METHOD FOR DETECTING A CYBER-ATTACK AT SCADA/ICS MANAGED PLANTS

CROSS-REFERENCE TO RELATED APPLICATIONS

This application is a continuation-in-part of International Application No. PCT/IL2016/051268, filed Nov. 25, 2016, which claims priority to Israeli Application No. 242808, filed Nov. 26, 2015, the entire contents of which are incorporated herein by reference.

FIELD OF THE INVENTION

The present invention relates to the field of protection of industrial systems. More particularly, the invention relates to a system and method for detecting a cyber-attack inflicted by an attacker seeking to cause physical damage at an industrial facility (hereinafter a "plant") or to harm the plant functionality.

BACKGROUND OF THE INVENTION

SCADA (Supervisory Control and Data Acquisition) ICS (Industrial Control Systems) systems are responsible to the managing of industrial equipment and processes at plants, such as a manufacturing plant, a power generation plant, a water treatment plant, a telecommunication facility, and a transportation facility. Failure of a SCADA/ICS (hereinafter a "SCADA") managed plant has serious repercussions, including injury, national security implications, reputation degradation implications, significant economic damage and in some cases even a loss of human life. Therefore protecting such plants from physical damage and harming its functionality is of much importance.

The damage potential of SCADA failures that lead to physical damage makes the plants a preferred target for attacks in general, and cyber-attacks in particular.

Figure 1:
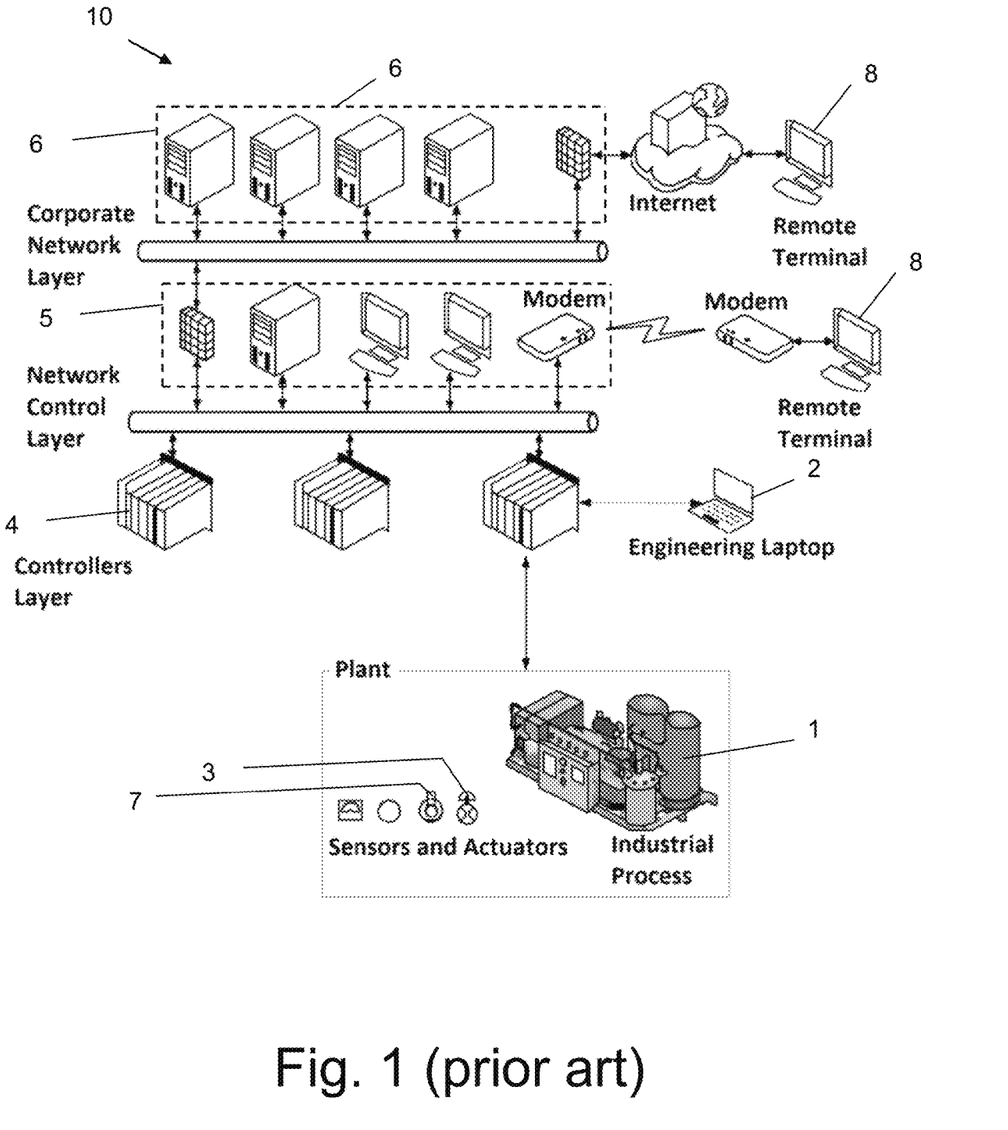
FIG. 1 is a schematic illustration of a typical prior art SCADA-controlled system.

As shown in FIG. 1 (prior art), a SCADA-controlled system 10 generally comprises the following units: (a) electromechanical components 3, such as a controlled valve or pump (or different types of actuators), which are operatively connected with stationary elements, for initiating a controlled change at the plant, (b) Programmable Logic Controllers (PLCs) 4 (hereinafter "Controllers") for controlling an actuated operation of each of the electromechanical components 3, (c) a supervisory computer system (hereinafter "SCADA") 5 (including Human-Machine Interface (HMI) display devices by which plant data can be graphically visualized and by which the operator can input commands to one or more selected controllers 4) for receiving plant related data and sending commands to the various controllers 4 in response to the received plant related data, (d) sensors 7 distributed throughout the plant for generating sensed signals, (e) remote terminals and or computers 8 for remotely accessing the SCADA 5 and/or the corporate computer system 6, (f) configuration/update computer 2 that is used to configure, update and maintain one or more of the programmable controllers 4, (g) plant 1 defined by its one or more industrial sub-processes called industrial functional control loops (hereinafter a "control loop").

SCADA managed plants are therefore vulnerable to cyber-attacks as controllers 4 can't differentiate between malicious and harmless commands. In addition, there is no way to validate the code and configuration of the controllers. The above is an outcome of controllers 4 internal design to ensure their reliability and robust operation. Most of the exiting controllers 4 lack suitable security measures and have limited computational resources. Attackers thus exploit these vulnerabilities and others in an attempt to generate a malfunction in an industrial plant and to thereby create chaotic conditions, such as a widespread blackout when the plant is a power generation or distribution plant. SCADA 5 and the corporate computer system 6 are also vulnerable and may be targets of cyber-attacks.

Many of the available SCADA attack detection methods are based on "anomaly recognition","machine learning", attacks "signature recognition" or other methods that compares the system operation indicators with anticipated "normal" indicators, as well as on statistical recognition of deviations, irregularity, anomalousness, freakishness, abnormality and more.

In these prior art methods, the data recorded and output by the SCADA system is not reliable due to the fact that the controllers 4 and potentially the SCADA 5 are subject to attacks and therefore, may not accurately reflect the actual operational conditions. Also, some of the predetermined anticipated indicators are probabilistic, and therefore, cannot be completely relied upon, as a basis of comparison with plant related indicators. The above existing prior art solutions are not based on physical modeling of the industrial process, but rather on the above elements such as machine learning and pre-defining of system normal behavior, most of them are focused on monitoring of the network layer. Therefore, such solutions are not designed to handle cyber security attacks in plants that are already infected by preceding attacks, prior to activating them. Also, such solutions have low chance to protect against "Zero-day" vulnerabilities.

US 2013/0176132 discloses a method and system for detecting an intrusion in networked control systems. An operating model of the system being controlled is generated, and comprises a relationship between a plurality of components in the system as defined by a plurality of parameters. An intrusion alert is triggered based on an analysis of a latest value of at least one parameter of the system. However, this prior art is not related to the physical modeling of a plant.

It is an object of the present invention to provide a system and method for detecting cyber-attacks inflicted by an attacker seeking to cause physical damage or harming the functionality of an industrial plant.

It is an additional object of the present invention to provide a system and method for detecting cyber-attacks with low rate of false positive or false negative alerts by differentiating between cyber-attacks and operational failures of the industrial process.

Other objects and advantages of the invention will become apparent as the description proceeds.

SUMMARY OF THE INVENTION

The present invention is directed to a method for detecting a cyber-attack inflicted by an attacker seeking to cause physical damage or harm the functionality of a SCADA system-managed plant, comprising the steps of:
a) providing the plant with one or more dedicated industrial computerized devices, passively connected to the SCADA system, i.e. without intervention in data exchanged with the SCADA system or in its data rate, wherein each of the industrial computerized devices comprises a processor that is configured with a data validation module to determine whether data flow outputted from a SCADA-connected controller, adapted to command operation of each electromechanical component of a corresponding controlled subsystem of the plant, is authentic, i.e. whether the outputted data flow is validated or tampered, and with an alert issuing mechanism that is activated following detection that the outputted data flow is indicative of a cyber-attack perpetrated with respect to the controller;

b) generating an operational model for a given one of said controlled subsystems that defines a relation between physical parameters of said given subsystem and that defines a combination of those data inputs which cannot coexist for use in a command of an actuated operation of each electromechanical component of said given subsystem, wherein said operational model is configured to output predicted output data that is predicted to be output from said controller if given input data were input to said controller;

c) defining one or more attack vectors for said given subsystem, wherein each of said attack vectors is indicative of a set of predicted plant data at different component interfaces related to said given subsystem that is predicted to cause physical plant damage;

d) passively monitoring in parallel, by the one or more dedicated industrial computerized device, data communicated between each of the controllers and the SCADA system including the outputted data at the nearest points of each of the controllers;

e) seeking, by the one or more dedicated industrial computerized devices, mismatches between the monitored output data which is output from said controller and the predicted output data, with respect to specific input data;

f) if a mismatch is detected, determining by the dedicated industrial computerized device whether the monitored output data is linked to one of said defined attack vectors; and g) activating said alert issuing mechanism to issue a security alert upon detecting that the monitored output data is linked to one of said defined attack vectors and is indicative of a cyber-attack perpetrated with respect to said controller.

The method may further comprise the steps of:
a) operatively adding external sensors to one or more of the subsystems that are unconnected to the SCADA-connected controller and that measure physical parameters;
b) monitoring, by the at least one dedicated industrial computerized device, data outputted from each of the external sensors; and
c) detecting a mismatch between data outputted from each of the external sensors and the monitored output data which is output from the controller.

The operational model is based on information related to an electromechanical component of the given subsystem which is provided by its manufacturer.

The issued alerts may be sent to a higher hierarchy computerized device, the higher hierarchy computerized device adapted to collect inputs from one or more industrial computerized devices and optionally to get inputs from other information security sources in order to build a plant/facility security situation awareness picture.

Finding mismatches between the monitored output data which is output from the controller and the predicted output data may be enhanced by data outputted from the external sensors.

The attacks to be detected may be defined by performing a cyber-security survey according to attacks that are derived from attributes of the subsystems.

A cyber-attack may be additionally detected by finding a mismatch between information received by one of the industrial computerized devices from a command channel over which the SCADA system sends commands to actuate the electromechanical component and from a data channel over which the controller sends the outputted data to the SCADA system.

The dedicated industrial computerized device of the corresponding controlled subsystem determines that the monitored output data is indicative of an operational malfunction if it is not linked to one of the defined attack vectors and a mismatch has been detected.

In one aspect, two or more dedicated industrial computerized devices are connected to the SCADA system and monitor in parallel the data communicated between each of the controllers and the SCADA system.

The present invention is also directed to a system for detecting a cyber-attack inflicted by an attacker seeking to cause physical damage to, or harm functionality of, a SCADA system managed plant configured with one or more controlled subsystems, wherein each of said subsystems comprises one or more SCADA-connected controllers adapted to collectively command operation of each electromechanical component of the subsystem in response to receiving input data associated with an input command from the SCADA system and also adapted to output to the SCADA system data indicative of an actuated operation of each electromechanical component, said system for detecting a cyber-attack comprising at least one dedicated industrial computerized device connected to the SCADA system without intervention in data exchanged with the SCADA system or in its data rate, wherein each of the industrial computerized devices comprises a processor that is configured with a data validation module to determine whether the data outputted from one of said SCADA-connected controllers is validated or tampered, and with an alert issuing mechanism that is activated following detection that the outputted data is indicative of a cyber-attack perpetrated with respect to the controller, wherein the at least one dedicated industrial computerized device is operable to:

a) generate an operational model for a given one of said controlled subsystems that defines a relation between physical parameters of said given subsystem and that defines a combination of those data inputs which cannot coexist for use in a command of an actuated operation of each electromechanical component of said given subsystem, wherein said operational model is configured to output predicted output data that is predicted to be output from said controller if given input data were input to said controller;

b) define one or more attack vectors for said given subsystem, wherein each of said attack vectors is indicative of a set of predicted plant data at different component interfaces related to said given subsystem that is predicted to cause physical plant damage;

c) monitor without intervention data communicated between said controllers and the SCADA system including the outputted data at a nearest point of said controllers;

d) seek mismatches between the monitored output data which is output from said controller and the predicted output data, with respect to specific input data;

e) determine if a mismatch is detected, whether the monitored output data is linked to one of said defined attack vectors; and f) activate said alert issuing mechanism to issue a security alert upon detecting that the monitored output data is linked to one of said defined attack vectors and is indicative of a cyber-attack perpetrated with respect to said controller.

The at least one dedicated industrial computerized device may have one or more interfaces with external sensors for measuring physical parameters that are deployed in selected regions of the given subsystems, the external sensors being independent of a control system of the plant and do not influence any industrial operational process. Each of the external sensors may be in data communication with one of the industrial computerized devices via an isolated and protected data channel and is unconnected to the SCADA-connected controller.

The external sensors may be selected from one or more sensors from the group consisting of temperature sensor, pressure sensor, optical sensor, vibration sensor voltage sensor and other sensors measuring physical parameters.

The at least one dedicated industrial computerized device of the corresponding controlled subsystem is operable to determine that the monitored output data is indicative of an operational malfunction if it is not linked to one of the defined attack vectors and a mismatch has been detected.

In one aspect, the at least one dedicated industrial computerized device is also operable to generate a plant model which is configured to output data that is predicted to be output from a controller from a first subsystem if given input data were input to a controller of a second subsystem as a result of an interaction between the first and second subsystems, and to determine, if a mismatch is detected between the monitored output data and the predicted output data which is output from the plant model, whether the monitored output data is linked to one of the defined attack vectors.

DETAILED DESCRIPTION OF THE PREFERRED EMBODIMENTS

Industrial systems are prime target for a cyber-attack due to the significant potential damage that can be inflicted to the plant as a result of an attack. The system and method of the present invention are able to detect a cyber-attack inflicted by an attacker seeking to cause physical damage or harm the functionality of an industrial plant. Furthermore, the present invention can discriminate between operational failures and failures caused by cyber-attacks of the industrial process. Also, such discrimination allow defending the industrial process with lower rate of false alarms than prior art detection systems, by comparing detected operational mis-behavior or malfunctions in the plant with previously defined anticipated cyber-attack vectors.

Figure 2:
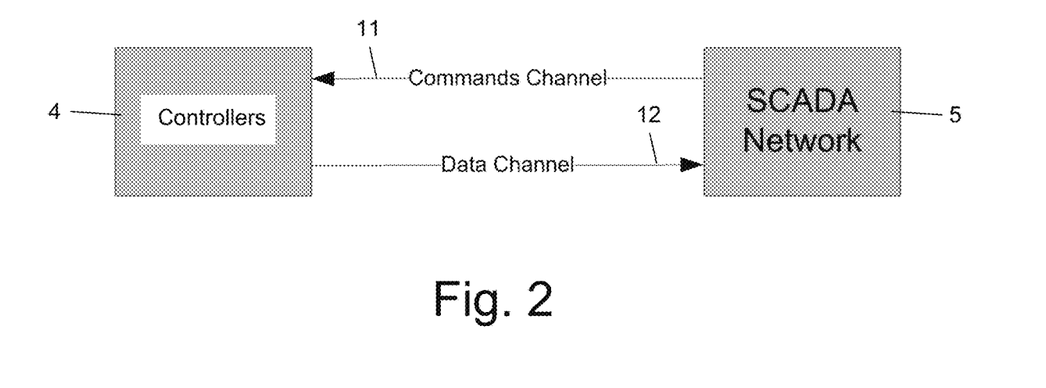
FIG. 2 is schematically illustrates communication channels between the SCADA and the controllers.

In order to appreciate the context of the present invention, reference is first made to FIG. 2, which schematically illustrates communication channels between SCADA 5 and controllers 4. SCADA 5 interfaces with controllers 4 by a command channel 11, over which SCADA 5 sends commands in order to actuate an electromechanical component 3 in a desired fashion, and by a data channel 12, over which controllers 4 sends to SCADA 5 plant data. This data is indicative of an industrial process performed by a corresponding electromechanical component 3. The controllers 4 can be attacked via their communication interfaces or by physical access, in order to re-program or tamper them. Attackers are consequently able to not only reprogram controllers 4 to cause an unwanted change in their behavior, but also to cause the controllers 4 to output data that seemingly reflects normal operation, while the actual operation of the industrial process has been tampered. Therefore, the reliability of the plant data viewable by the HMI 5 or other alternative display devices, serving the plant operator to take decisions, might be erroneous. In light of the above, the plant operator cannot make a true assessment of a plant operational status, severely limiting his decision making and risk assessment ability, specifically regarding the plant cyber-security.

Figure 3:
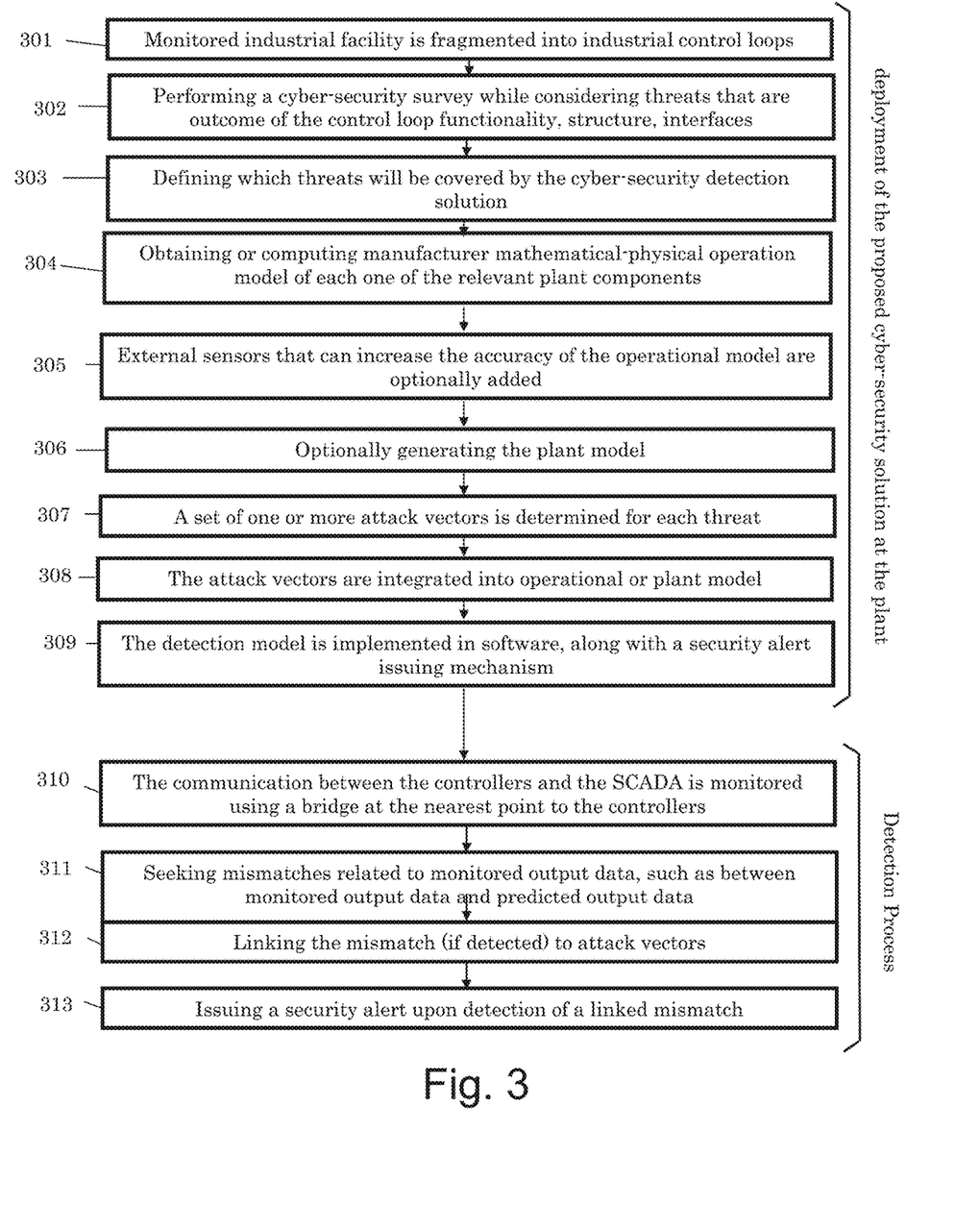
FIG. 3 is a flow-chart illustrating the steps of a method for detecting a cyber-attack inflicted by an attacker seeking to cause physical damage at a plant, according to one embodiment of the invention.

Broadly speaking, FIG. 3 is a flow-chart illustrating the steps of a method for detecting a cyber-attack inflicted by an attacker seeking to cause physical damage at a plant, according to one embodiment of the invention. At the first step 301, the monitored industrial facility is fragmented into control loops. Each control loop is a controlled sub-system that consists of several components and that has a determined physical function. For example, a water circulation system consists of a pump, pipes, pressure meters (gauges), temperature sensors filters and flow-(gauges), which is adapted to increase the pressure in a particular segment of a water pipe. Another example is a turbine with its peripheral devices, such as its feeding system and outlet pipes. Each such industrial control loop also includes one or more SCADA-connected controllers that are subject to cyber-attacks. The controllers are adapted to collectively command operation of each electromechanical component of the subsystem in response to receiving input data via the command channel from the SCADA system and are also adapted to output to the SCADA system data via the data channel which is indicative of an actuated operation of each electromechanical component.

At the next step 302, a cyber-security survey is performed while considering threats that are outcome of the control loop attributes such as functionality, structure, interfaces, etc. This step defines for each control loop, its interfaces with other components, its functionality, access and threats. For example, a turbine installed in one site may be propelled by dry steam (which almost does not contain water particles in suspension) may be vulnerable to cyber-attacks that change the steam dryness. On the other hands, the same turbine installed in another site may be propelled by gas and will be vulnerable to different types of attack methods that can be derived by cyber-attacks. Also, if the turbine is designed to rotate at a particular speed at one site and at a higher speed at another site, the conditions to attack and cause it to be out of control will be different.

At the next step 303, it is defined which threats will be covered by the proposed cyber-security detection solution. This step selects which threats (out of the potential threats defined in the preceding step) that may be relevant to a particular site, since each site is free to decide for which threats to gain alerts (and take the risks for other threats).

At the next step 304, an operational model is provided for a given controlled subsystem that defines a relation between physical parameters of the subsystem, to output data that is predicted to be output from a controller if given input data were input thereto. The operational model also defines a combination of those data inputs which cannot coexist for use in a command of an actuated operation of each electromechanical component of the subsystem. If so desired, the operational model may be device-specific and may be provided by a manufacturer of the device or of the subsystem. The operational model is generated for each subsystem that is subject to a threat (according to step 303). If the physical model is not provided by the manufacturer, it can be computed or otherwise generated offline using simulation.

The operational model may be a mathematical-physical model, which is based on an algorithm and a set of formulas, or expressed by a mathematical function, to predict how a device will function under given physical parameters. For example, the operational model for a turbine defines by a formula (or algorithm) the correlation between the operational physical parameters, such as rotational speed, different kinds of pressures and vibration.

At the next step 305, external sensors that can increase the accuracy of the operational model are optionally added. These external sensors may be added at particular locations and may have any desired accuracy, in order to enhance the physical model. The external sensors are typically adapted to measure physical parameters which are not measured by the inherent sensors of the control loop and are not connected to the SCADA network, but provide data directly to a dedicated industrial computerized device 20 (which will be described later on) via isolated and protected data channels.

At the next step 306 an operational model of the plant is optionally generated, to output data that is predicted to be output from a controller from a first subsystem if given input data were input to a controller of a second subsystem as a result of the interaction between the first and second subsystems. The plant model considers the reliability of each input, by a command channel or by an internal or external sensor, to achieve more robust detection capability. The plant model may take into account the outputs of external sensors, if added. A plant is defined as a collection of two or more interconnected control loops.

At the next step 307, a set of one or more attack vectors is defined and linked to threats (determined in step 303 above). An attack vector is indicative of a set of predicted plant data at different component interfaces related to a given subsystem that is predicted to cause physical plant damage. For example, an attack vector may be an event where the pressure in a particular pipe segment exceeds a defined safety threshold.

At the next step 308, the attack vectors are integrated into an operational model, or into a plant model, in order to obtain a cyber-attack detection model. This step actually defines how each attack vector is implemented in a physical system. For example, if an attack vector defines that a pipe will explode due to an uncontrolled pressure rise, the detection model will take into account which alternative scenarios, or combination of scenarios, in a physical system have to occur prior to such a pipe explosion. Some alternative scenarios that precede the aforementioned attack vector include, for example, an occurrence that the rotational speed of a pump exceeds a particular limit, the pump operates while its outlet valve is closed, or a filter is blocked. These scenarios are liable to cause the pressure to rise and the attack vector to be implemented.

At the next step 309, the detection model is implemented in software, along with a security alert issuing mechanism. This software implemented model can extract, out of the data exchanged with the SCADA system, the data that is relevant to one or more attack vectors implemented in step 308 above, in order to identify scenarios of impending execution of an attack vector and generate an alert about them.

Steps 301-309 reflect the deployment of the proposed cyber-security solution at the plant.

Steps 310-313 reflect the detection process.

At the next step 310 the communication between the controllers 4 and the SCADA 5 is passively monitored (without intervention in the exchanged data or the data rate) at the nearest point to the controllers 4. The nearest point may be a data link adjacent to an output port of the controller that leads to the data line between the controller and the SCADA system, to ensure reliable monitoring without interference from another component connected to the data line.

At the next step 311 mismatches related to the monitored output data which is output from a controller are sought, in order to identify a cyber-attack. A mismatch may be between the monitored output data and the predicted output data with respect to specific data input to the controller. Alternatively, a mismatch may be between the monitored output data and actual output data provided by an external sensor. For example, if the monitored output data indicates that an outlet valve of a pipe is maximally open and the input data which is input to the controller from the SCADA system is indicative of a command to lower the pressure within the pipe, a mismatch would ordinarily not be detected. However, if the external sensor senses that the system pressure in the pipe continues to rise, there is an indication that the monitored output data has been tampered.

At the next step 312, the mismatch (if detected) is linked to one (or more) attack vectors. If it cannot be linked to any attack vector, it is classified by the detection system as a plant operational failure (rather that an attack).

At the next step 313, upon detection of a linked mismatch, a security alert is issued.

Figure 4:
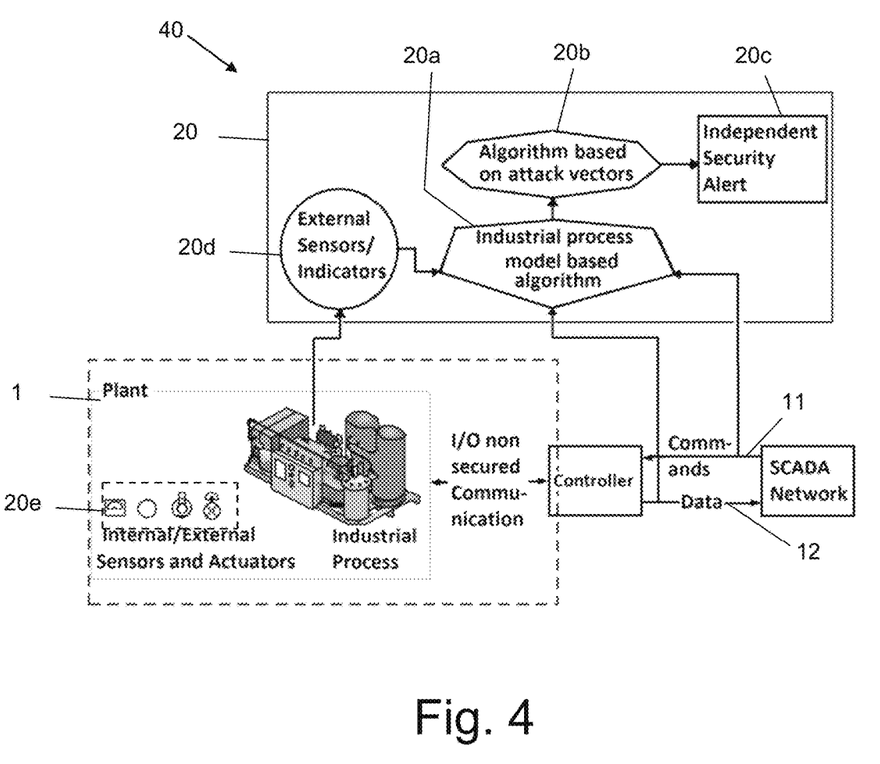
FIG. 4 illustrates employing a dedicated industrial computerized device as a part a SCADA-controlled system, for allowing the plant operator to get a better cyber security situation awareness of the controlled loop, according to one embodiment of the invention.

In order to allow the plant operator to get a better cyber security situation awareness of the control loop, dedicated industrial computerized device 20 (implemented as a part of system 40) shown in FIG. 4, is employed. System 40 may comprise the units of system 10 illustrated in FIG. 1, and further comprises the proposed cyber-attack detection system consisting of at least one dedicated industrial computerized device 20, preferably one computerized device for each control loop. In order to detect cyber-attacks on system 10, dedicated industrial computerized device 20 maintains several interfaces with system 10, for example monitoring command channel 11 and data channel 12. Dedicated industrial computerized device 20 receives information from both channels (and optionally from additional sources). Dedicated industrial computerized device 20 performs logic analysis and data validation, while using the detection process described above, in order to cross and validate the inputs and to issue an alert, if required.

The following computational steps are hosted by dedicated industrial computerized device 20. At the first computational step 20a, the dedicated industrial computerized device 20 performs logic analysis of the received information, in order to decide whether the different inputs collected can co-exist while validating them using inter-alfa the operational model or the plant model (discussed above with respect to FIG. 3) in order to seek mismatches. At the second computational step 20b, if a mismatch is detected, the process tries to link it to one or more attack vectors. At the third computational step 20c, if such linking has been found, the process will issue a security alert.

The dedicated industrial computerized device 20 has optional interface(s) 20d with external sensors 20e (not inherent in system 10).

As described, it is possible to add external sensors 20e so as to be installed at selected regions within the plant. Those external sensors are independent of the control system of the plant and do not influence the industrial operational process. The external sensors 20e are positioned in a way that will increase the detection certainty in accordance to the initial site survey. For example, external sensors 20e may be similar to an inherent sensor but with higher sampling rate and performance, or in different locations within the control loop. Alternatively, external sensors 20e may measure parameters that are not measured by the inherent sensors of system 10.

In addition to the prior art advantages, the following advantages are obtained using the process proposed by the present invention:
a) Tampering of one of the controllers 4 will be detected.
b) An attack, that was made prior to installation of the system 40, and is still operational, will be detected.
c) Detection of attacks resulting from a "Zero-day" vulnerability is embedded in the system design.

The following examples illustrate advantages of the present invention.

Example 1

Prior Art Protection is Implemented

Figure 5:
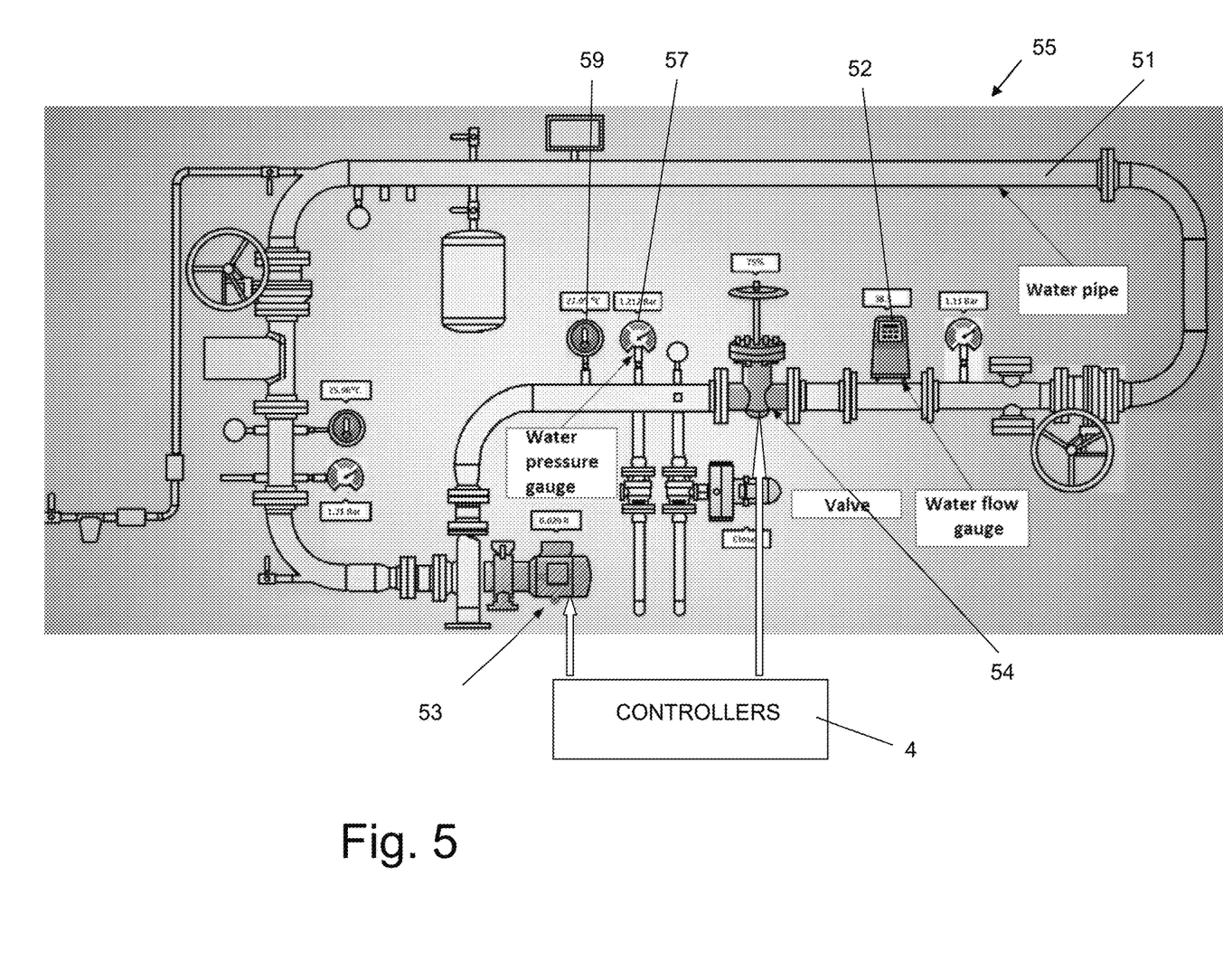
FIG. 5 schematically illustrates an example of a user interface screenshot designed to illustrate the alerts in context with the industrial process.

Plant 55 illustrated in FIG. 5 serves to pump water through pipe 51, and to maintain the water pressure, flow rate and temperature within a predetermined range. Controller 4 is programmed to control the operation of pump 53 and the opening of valve 54. For safety reasons, controller 4 is programmed to deactivate pump 53 if the pressure, flow rate or temperature exceed predetermined values and physically endanger the system integrity.

In one attack scenario characteristic of prior art operation, controller 4 has been tampered and was re-programmed to command closure of valve 54 without deactivating the pump 53 when the pressure exceeds the safety threshold, while outputting plant data that is indicative that the valve is open and the pressure is valid even though pressure gauge 57 is transmitting data related to high pressure values that are steadily increasing and crossing the safety barrier. The HMI displays pressure values that are indicative of normal operation conditions and are within the valid safety range.

The water pressure within pipe 51 is steadily increasing and bursts after becoming excessive. Pump 53 becomes overloaded. Thus, actual physical damage has been caused to the plant.

Example 2

The Protection Proposed by the Present Invention is Implemented

With respect to the same attack scenario described in Example 1, the outputs of controller 4 are compared with the control loop's physical model. The detection method gets the tampered information from the controller 4, verifies the information from the different sensors and come to a conclusion that from a physical point of view, the opening level of the valve 54, the effort of the pump 53, the water flow rate 52 and the water pressure 57 in the pipe 51 can't co-exist. The detection unit conclusion is that the valve information is not reliable and is not in correlation with the rest of the parameters.

In order to determine whether the non-conformance is due to a malfunction or due to a cyber-attack, the system compares the plant data output by controller 4 with attack vector indicators. After an attack vector correlation has been found, an alert is generated. The operator deactivates pump 53 and damage is avoided.

The alerts of the industrial computerized device 20 may be sent to a higher hierarchy computerized device, which may be adapted to collect inputs from one or more industrial computerized devices and optionally to get inputs (e.g. information, logs, alerts, etc.) from other information security sources, in order to build the plant/facility security situation awareness picture.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for detecting a cyber-attack inflicted by an attacker seeking to cause physical damage to, or harm the functionality of, a Supervisory Control and Data Acquisition (SCADA) system-managed plant configured with one or more controlled subsystems, wherein each of said subsystems comprises one or more SCADA-connected controllers adapted to collectively command operation of each electromechanical component of the subsystem in response to receiving input data associated with an input command from the SCADA system and also adapted to output to the SCADA system data indicative of an actuated operation of each electromechanical component, said method comprising the steps of:
  a) providing said plant with one or more dedicated industrial computerized devices, connected to a SCADA system without intervention with respect to data exchanged with the SCADA system or to its data rate, wherein each of said industrial computerized devices comprises a processor that is configured with a data validation module to determine whether the data outputted from one of said SCADA-connected controllers is validated or tampered, and with an alert issuing mechanism that is activated following detection that the output data is indicative of a cyber-attack perpetrated with respect to said controller;
  b) generating an operational mathematical-physical model for a given one of said controlled subsystems by performing a cyber-security survey that defines electromechanical and non-electromechanical components for said given subsystem having a determined physical function as well as physical interfaces between each pair of said components, and providing by a set of formulas, an algorithm or a mathematical function, a correlation between physical parameters of said given subsystem, wherein said operational model is configured to output predicted output data that is predicted to be output from said controller if given input data were input to said controller;

c) defining one or more attack vectors for said given subsystem, wherein each of said attack vectors is indicative of a set of predicted plant data at different component interfaces related to said given subsystem that is predicted to cause physical plant damage;

d) generating a cyber-attack detection model by integrating said one or more attack vectors with said generated operational mathematical-physical model to define how each of said one or more attack vectors is implemented in the given one of said controlled subsystems during a cyber-attack;

e) monitoring without intervention, by said one or more dedicated industrial computerized devices, data communicated between said controller and said SCADA system, including the output data, at a nearest point of said controller;

f) seeking, by said one or more dedicated industrial computerized devices, mismatches between the monitored output data which is output from said controller and the predicted output data, with respect to specific input data;

g) if a mismatch is detected, determining by said dedicated industrial computerized device of said given subsystem whether the monitored output data is linked to one of said defined attack vectors; and h) activating said alert issuing mechanism to issue a security alert upon detecting that the monitored output data is linked to one of said defined attack vectors and is indicative of a cyber-attack perpetrated with respect to said controller.

2. The method according to claim 1, further comprising the steps of:

a) operatively adding, to the given subsystem, external sensors installed at selected regions within the plant that are unconnected to the SCADA-connected controller and that measure physical parameters;

b) monitoring, by said one or more industrial computerized devices, data outputted from each of said external sensors; and c) detecting a mismatch between the data outputted from each of said external sensors and the monitored output data which is output from the controller.

3. The method according to claim 2, wherein finding mismatches between the monitored output data which is output from the controller and the predicted output data is enhanced by data outputted from the external sensors.

4. The method according to claim 1, wherein the operational model is based on information related to an electromechanical component of the given subsystem which is provided by its manufacturer.

5. The method according to claim 1, wherein the issued alert is sent to a higher hierarchy computerized device, said higher hierarchy computerized device adapted to collect the data inputs from the one or more industrial computerized devices and optionally to get inputs from other information security sources in order to build a plant/facility security situation awareness picture.

6. The method according to claim 1, wherein the cyber-security survey also defines the attacks to be detected according to attacks that are derived from attributes of the subsystems.

7. The method according to claim 1, wherein a cyber-attack is additionally detected by finding a mismatch between information received by one of the industrial computerized devices from a command channel over which the SCADA system sends commands to actuate the electromechanical component and from a data channel over which the controller sends the outputted data to the SCADA system.

8. The method according to claim 1, wherein the dedicated industrial computerized device of the corresponding controlled subsystem determines that the monitored output data is indicative of an operational malfunction if a mismatch between the monitored output data and the predicted output data has been detected and the monitored output data is correlated to the generated operational mathematical-physical model.

9. The method according to claim 1, wherein two or more dedicated industrial computerized devices are connected to the SCADA system and monitor in parallel the data communicated between each of the controllers and the SCADA system.

10. The method according to claim 1, wherein the operational mathematical-physical model is generated for the given subsystem so as to additionally define a combination of those data inputs which cannot coexist for use in a command of an actuated operation of each electromechanical component of the given subsystem.

11. The method according to claim 1, wherein the operational mathematical-physical model is a plant model that defines, by a set of formulas, an algorithm or a mathematical function, a correlation between physical parameters of two or more interconnected subsystems.

12. A system for detecting a cyber-attack inflicted by an attacker seeking to cause physical damage to, or harm functionality of, a SCADA system managed plant configured with two or more controlled subsystems, wherein each of said subsystems comprises:

i. one or more SCADA-connected controllers adapted to collectively command operation of each electromechanical component of the subsystem in response to receiving input data associated with an input command from the SCADA system and also adapted to output to the SCADA system data indicative of an actuated operation of each electromechanical component;

ii. one or more inherent sensors connected to said one or more SCADA-connected controllers, for measuring subsystem-specific physical parameters; and iii. one or more external sensors installed at selected regions within the plant for measuring subsystem-specific physical parameters, said external sensors being unconnected to said one or more SCADA-connected controllers and do not influence any industrial operational process, said system for detecting a cyber-attack comprising at least one dedicated industrial computerized device connected to a SCADA system without intervention with respect to data exchanged with the SCADA system or to its data rate, wherein each of said industrial computerized devices comprises a processor that is configured with a data validation module to determine whether the data outputted from a given one of said SCADA-connected controllers is validated or tampered, and with an alert issuing mechanism that is activated following detection that the output data is indicative of a cyber-attack perpetrated with respect to said given controller, and also has one or more interfaces with each of said external sensors, wherein said at least one dedicated industrial computerized device is operable to:

a) generate an operational mathematical-physical model for a given one of said controlled subsystem that defines electromechanical and non-electromechanical components for said given subsystem having a determined physical function as well as physical interfaces between each pair of said components, and additionally defines by a set of formulas, an algorithm or a mathematical function, a correlation between physical parameters of said given subsystem, wherein said operational model is configured to output predicted output data that is predicted to be output from said given controller if given input data were input to said given controller;

b) define one or more attack vectors for said given subsystem, wherein each of said attack vectors is indicative of a set of predicted plant data at different component interfaces related to said given subsystem that is predicted to cause physical plant damage;

c) integrate said one or more attack vectors with said generated operational mathematical-physical model to define how each of said one or more attack vectors is implemented in said given subsystem during a cyber-attack;

d) monitor without intervention data communicated between said given controller and said SCADA system including the output data at a nearest point of said given controller;

e) seek mismatches between the monitored output data which is output from said given controller and the predicted output data, with respect to specific input data, or between the monitored output data which is output from said given controller and actual output data provided by at least one of said external sensors;

f) determine, if a mismatch is detected, whether the monitored output data is linked to one of said defined attack vectors; and g) activate said alert issuing mechanism to issue a security alert upon detecting that the monitored output data is linked to one of said defined attack vectors and is indicative of a cyber-attack perpetrated with respect to said given controller.

13. The system according to claim 12, wherein each of the external sensors is selected from one or more sensors from the group consisting of temperature sensor, pressure sensor, optical sensor, vibration sensor voltage sensor and other sensors measuring physical parameters.

14. The system according to claim 12, wherein each of the external sensors is in data communication with one of the industrial computerized devices via an isolated and protected data channel.

15. The system according to claim 12, wherein the at least one dedicated industrial computerized device is operable to determine that the monitored output data is indicative of an operational malfunction if it is correlated with the generated operational mathematical-physical model and a mismatch has been detected.

16. The system according to claim 12, wherein the at least one dedicated industrial computerized device is also operable to generate a plant model which is configured to output data that is predicted to be output from a controller from a first subsystem if given input data were input to a controller of a second subsystem as a result of an interaction between the first and second subsystems, and to determine, if a mismatch is detected between the monitored output data and the predicted output data which is output from the plant model, whether the monitored output data is linked to one of the defined attack vectors.

17. The system according to claim 12, wherein the at least one dedicated industrial computerized device is additionally operable to generate the operational mathematical-physical model for the given subsystem so as to additionally define a combination of those data inputs which cannot coexist for use in a command of an actuated operation of each electro-mechanical component of the given subsystem.

18. The system according to claim 12, wherein each of the external sensors is of a similar type as the one or more inherent sensors but with a higher sampling rate and performance, or is located at a different subsystem related plant region than that of the one or more inherent sensors.

19. The system according to claim 12, wherein each of the external sensors is configured to measure parameters that are not measured by the one or more inherent sensors.

* * * * *

UNITED STATES PATENT AND TRADEMARK OFFICE
CERTIFICATE OF CORRECTION

PATENT NO. : 11,093,606 B2  
APPLICATION NO. : 15/989748  
DATED : August 17, 2021  
INVENTOR(S) : Arov et al.

Page 1 of 1

It is certified that error appears in the above-identified patent and that said Letters Patent is hereby corrected as shown below:

In the Claims

Column 12,
Line 65, "said controlled subsystem" should read --said subsystem--.

Signed and Sealed this
Second Day of August, 2022

Katherine Kelly Vidal
*Director of the United States Patent and Trademark Office*